US010427586B2

(12) United States Patent
Takaya et al.

(10) Patent No.: US 10,427,586 B2
(45) Date of Patent: Oct. 1, 2019

(54) HEAD LAMP DEVICE OF VEHICLE

(71) Applicants: KAWASAKI JUKOGYO KABUSHIKI KAISHA, Kobe-shi, Hyogo (JP); KOITO MANUFACTURING CO., LTD., Tokyo (JP)

(72) Inventors: Satoshi Takaya, Akashi (JP); Akira Saijyo, Shizuoka (JP); Hiroyuki Harada, Shizuoka (JP)

(73) Assignees: KAWASAKI JUKOGYO KABUSHIKI KAISHA, Kobe-shi, Hyogo (JP); KOITO MANUFACTURING CO., LTD., Tokyo (JP)

( * ) Notice: Subject to any disclaimer, the term of this patent is extended or adjusted under 35 U.S.C. 154(b) by 87 days.

(21) Appl. No.: 15/590,938

(22) Filed: May 9, 2017

(65) Prior Publication Data
US 2017/0327027 A1   Nov. 16, 2017

(30) Foreign Application Priority Data

May 10, 2016   (JP) ................. 2016-094236

(51) Int. Cl.
| | |
|---|---|
| *B60Q 1/00* | (2006.01) |
| *B62J 6/02* | (2006.01) |
| *F21S 41/19* | (2018.01) |
| *F21S 45/47* | (2018.01) |
| *F21S 45/50* | (2018.01) |
| *F21S 41/663* | (2018.01) |
| *F21S 41/148* | (2018.01) |

(52) U.S. Cl.
CPC .............. *B60Q 1/0094* (2013.01); *B62J 6/02* (2013.01); *F21S 41/148* (2018.01); *F21S 41/19* (2018.01); *F21S 41/663* (2018.01); *F21S 45/47* (2018.01); *F21S 45/50* (2018.01)

(58) Field of Classification Search
CPC ......... B60Q 1/0094; B62J 6/02; F21S 41/148; F21S 41/19; F21S 41/663; F21S 45/47; F21S 45/50
See application file for complete search history.

(56) References Cited

U.S. PATENT DOCUMENTS

| | | | | |
|---|---|---|---|---|
| 2,946,003 | A * | 7/1960 | La Verne | ............. G01R 19/145 324/506 |
| 4,225,902 | A * | 9/1980 | Ishikawa | ................ B60Q 1/076 362/40 |

(Continued)

FOREIGN PATENT DOCUMENTS

JP   2014117994 A   6/2014

*Primary Examiner* — Tsion Tumebo
(74) *Attorney, Agent, or Firm* — Alleman Hall Creasman & Tuttle LLP

(57) ABSTRACT

A head lamp device of a vehicle comprises a pair of lamp units arranged in a direction perpendicular to a forward and rearward direction of a vehicle body, each of the pair of lamp units including at least one light emitting element; and a lighting circuit unit which is supplied with electric power from a power supply and lights the at least one light emitting element, wherein at least a portion of the lighting circuit unit is disposed in a gap formed between the pair of lamp units in the direction in which the pair of lamp units are arranged.

12 Claims, 5 Drawing Sheets

(56) References Cited

U.S. PATENT DOCUMENTS

| | | | | |
|---|---|---|---|---|
| 4,691,198 A * | 9/1987 | Mortensen | H05F 3/00 | 340/649 |
| 4,733,333 A * | 3/1988 | Shibata | B60Q 1/122 | 362/346 |
| 5,879,073 A * | 3/1999 | Hori | B60Q 1/007 | 362/263 |
| 6,158,279 A * | 12/2000 | Saiki | G01P 1/026 | 73/493 |
| 6,302,568 B1 * | 10/2001 | Ohtaki | B60Q 1/007 | 362/546 |
| 6,428,186 B1 * | 8/2002 | Yoneyama | B60Q 1/0094 | 362/265 |
| 6,439,753 B1 * | 8/2002 | Sumada | B60Q 1/0041 | 362/475 |
| 7,080,929 B2 * | 7/2006 | Uemoto | B60Q 1/0041 | 362/475 |
| 7,314,297 B2 * | 1/2008 | Kitamura | B60Q 1/0005 | 362/473 |
| 7,628,517 B2 * | 12/2009 | Domoto | B60Q 1/0041 | 362/473 |
| 7,961,086 B2 * | 6/2011 | Bradley | B60Q 1/0017 | 340/468 |
| 9,371,104 B2 * | 6/2016 | Otsuji | B62J 6/02 | |
| 9,676,436 B2 * | 6/2017 | Otsuji | B62J 6/02 | |
| 9,963,064 B2 * | 5/2018 | Takaya | B62J 6/02 | |
| 2008/0239737 A1 * | 10/2008 | Aoki | B60Q 1/0041 | 362/475 |
| 2009/0008919 A1 * | 1/2009 | Mather | B60R 22/1951 | 280/807 |
| 2009/0040779 A1 * | 2/2009 | Ohzono | B60Q 1/0041 | 362/516 |
| 2011/0303201 A1 * | 12/2011 | Romano | F02P 3/05 | 123/620 |
| 2014/0293628 A1 * | 10/2014 | Otsuji | B62J 6/02 | 362/475 |

* cited by examiner

HEAD LAMP DEVICE OF VEHICLE

CROSS-REFERENCE TO THE RELATED APPLICATION

This application claims priority to and the benefit of Japanese Patent Application No. 2016-094236 filed on May 10, 2016, the entire disclosure of which is incorporated herein by reference.

BACKGROUND OF THE INVENTION

Field of the Invention

The present invention relates to a head lamp device of a vehicle.

Description of the Related Art

For example, as disclosed in Japanese Laid-Open Patent Application Publication No. 2014-117994, a head lamp device of a vehicle includes a light emitting element such as a light emitting diode (LED) light source, and a lighting circuit unit which lights (turns on) the light emitting element by electric power supplied from a power supply.

In some cases, there is a need for reduction of the size of the head lamp device of the vehicle. If the lighting circuit unit can be disposed by efficiently utilizing a space, in the head lamp device of the vehicle including the light emitting element, the size of the head lamp device can be easily reduced, which is desirable.

SUMMARY OF THE INVENTION

An object of the present invention is to dispose a lighting circuit unit by efficiently utilizing a space, in a head lamp device of a vehicle including a light emitting element and easily reduce the size of the head lamp device.

According to an aspect of the present invention, a head lamp device of a vehicle, comprises a pair of lamp units arranged in a direction perpendicular to a forward and rearward direction of a vehicle body, each of the pair of lamp units including at least one light emitting element; and a lighting circuit unit which is supplied with electric power from a power supply and lights the at least one light emitting element, wherein at least a portion of the lighting circuit unit is disposed in a gap formed between the pair of lamp units in the direction in which the pair of lamp units are arranged.

In accordance with this configuration, since at least a portion of the lighting circuit unit is disposed in the gap formed between the pair of lamp units in the direction in which the pair of lamp units are arranged (the direction is perpendicular to the forward and rearward direction of the vehicle body), the lighting circuit unit of the head lamp device can be disposed in this gap by efficiently utilizing the space. In addition, the dimension in the forward and rearward direction of the head lamp device can be reduced. As a result, the size of the head lamp device can be easily reduced.

The head lamp device may further comprise a lamp case which accommodates therein the pair of lamp units and is formed with a sealing structure for preventing entry of water into the lamp case, and the lighting circuit unit may be accommodated inside the lamp case.

Compared to a case where the lamp case has the sealing structure and the lighting circuit unit has the sealing structure, the structure of the head lamp device can be simplified, and the size of the head lamp device can be easily reduced. In addition, since it becomes possible to protect the lighting circuit unit from the water by the lamp case without a need to improve a water-proof property of the lighting circuit unit, manufacturing cost of the head lamp device can be reduced.

The lighting circuit unit may be a plate-shaped member and may be disposed in such a manner that a thickness direction of the lighting circuit unit conforms to the direction in which the pair of lamp units are arranged.

In this configuration, the lighting circuit unit can be easily disposed in the gap with a dimension which is small in the direction in which the pair of lamp units are arranged. As a result, the dimension in the direction in which the pair of lamp units are arranged, of the head lamp device, can be easily reduced, while efficiently utilizing the space to dispose the lighting circuit unit.

When viewed from a front, the lighting circuit unit may be disposed in a center region of the gap.

In accordance with this configuration, the lighting circuit unit can be disposed in the center region of the gap, by efficiently utilizing the space. In addition, the constituents located at the both sides of the center region of the gap of the head lamp device in the direction in which the pair of lamp units are arranged can be easily formed to have a symmetric structure, and the wires of the pair of lamp units located at the both sides of the center region of the gap of the head lamp device can be laid out in the same manner. As a result, the structure of the head lamp device can be simplified, and the size of the head lamp device can be easily reduced.

The direction in which the pair of lamp units are arranged may be a rightward and leftward direction of the vehicle body, and the lighting circuit unit may be disposed in the gap formed between the pair of lamp units in the rightward and leftward direction.

Since the direction in which the pair of lamp units are arranged is the rightward and leftward direction of the vehicle body, the gap can be easily formed between the pair of lamp units in the rightward and leftward direction, and the lighting circuit unit can be easily disposed in the gap formed between the pair of lamp units in the rightward and leftward direction.

A center of the lighting circuit unit in the forward and rearward direction may be located rearward of a center of the head lamp device in the forward and rearward direction.

In this configuration, even in a case where the head lamp device has a streamline shape in which the dimension in the rightward and leftward direction and the dimension in the vertical direction are gradually increased from its front end portion toward its rear portion, the lighting circuit unit can be disposed in the gap formed between the pair of lamp units in the direction in which the pair of lamp unit are arranged, by efficiently utilizing the space. As a result, the size of the head lamp device can be easily reduced.

The head lamp device may further comprise a connector wire connecting the lighting circuit unit to the light emitting element, the connector wire may include a connector at a portion connected to the lighting circuit unit, and the connector is disposed at a front side of the lighting circuit unit.

In this configuration, the lighting circuit unit can be disposed in the rear region of the gap formed between the pair of lamp units in the direction in which the pair of lamp units are arranged. For example, even in the case of the head lamp device having the streamline shape, the lighting circuit unit can be disposed in the gap formed between the pair of lamp units in the direction in which the pair of lamp unit are arranged, by efficiently utilizing the space, and the size of the head lamp device can be easily reduced.

The head lamp device may further comprises an accommodating section which accommodates therein the lighting circuit unit; and a resistor wire connected to the lighting circuit unit and extending to an outside region of the accommodating section, wherein a resistor element is connected to a portion of the resistor wire which is located outside the accommodating section.

Since the resistor element is connected to a portion of the resistor wire which is located outside the accommodating section, it is not necessary to dispose the resistor element inside the accommodating section. In this configuration, the lighting circuit unit can be disposed in the gap formed between the pair of lamp units in the direction in which the pair of lamp units are arranged, by efficiently utilizing the space, and the size of the head lamp device can be easily reduced. In addition, since the resistor element exposed outside the lamp case can be easily changed (replaced), and the dimension of the resistor element is not constrained by the accommodating section. Since the resistor element contacts the air such as the air flowing from the front, outside the accommodating section, heat can be released well from the resistor element.

In accordance with the present invention, in the head lamp device of the vehicle including the light emitting elements, the lighting circuit unit can be disposed by efficiently utilizing the space, and the size of the head lamp device can be easily reduced.

The above and further objects, features and advantages of the present invention will more fully be apparent from the following detailed description of preferred embodiment with reference to the accompanying drawings.

DETAILED DESCRIPTION OF THE EMBODIMENTS

Hereinafter, the embodiment of the present invention will be described with reference to the drawings. Throughout the drawings, the same or corresponding constituents are designated by the same reference symbols, and will not be described repeatedly. The stated directions are from the perspective of a rider straddling a vehicle 1. A vehicle width direction of the vehicle body of the vehicle 1 corresponds with a rightward and leftward direction of the vehicle body.

Figure 1:
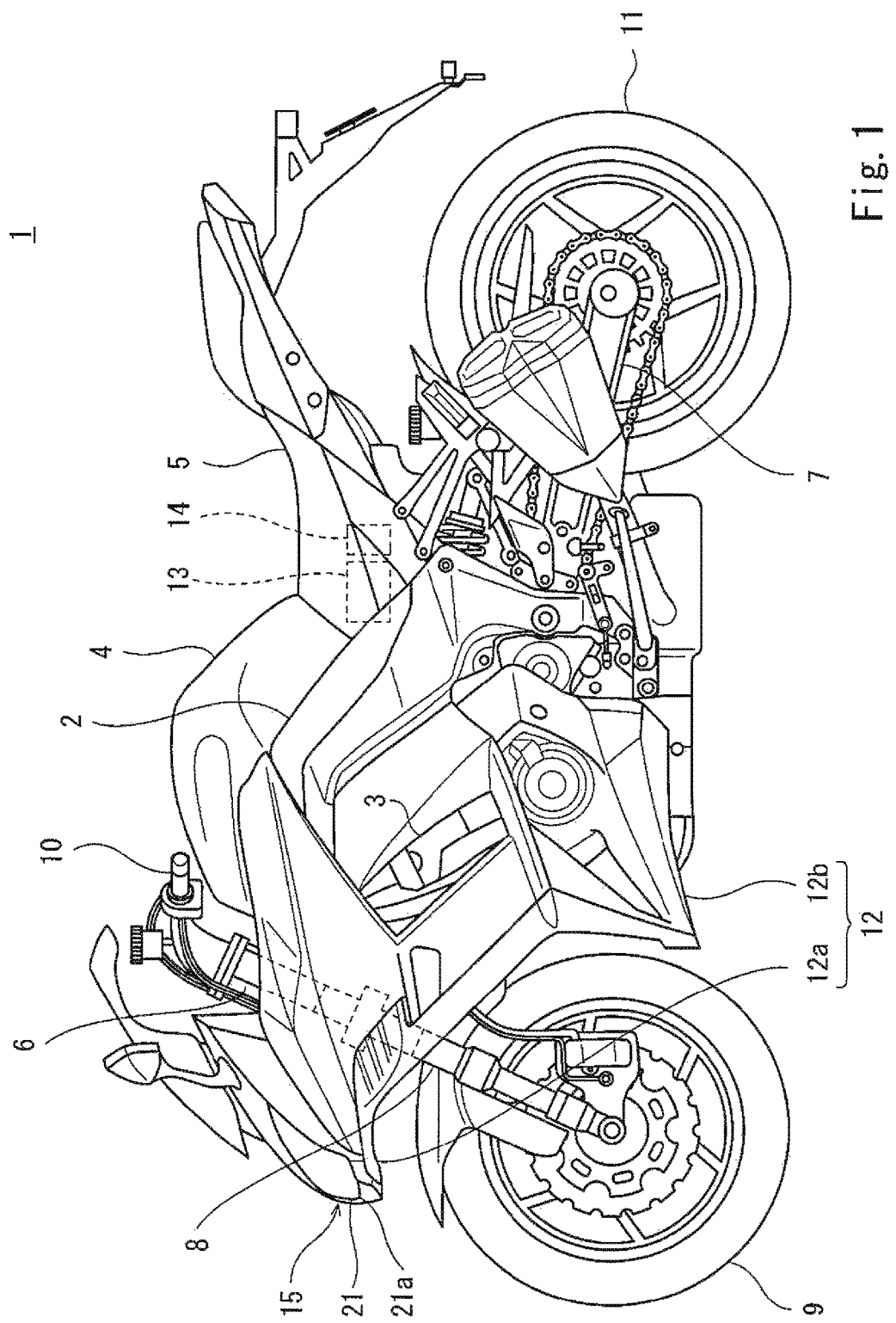
FIG. 1 is a left side view of a vehicle according to an embodiment.

FIG. 1 is a left side view of the vehicle 1 according to an embodiment. Referring to FIG. 1, the vehicle 1 is a straddle-type vehicle, specifically, a motorcycle. The vehicle 1 includes a vehicle body frame 2, a driving unit 3 which generates driving power for the vehicle 1 to travel, a fuel tank 4, a seat 5, a steering shaft 6, a swing arm 7, a pair of front forks 8, a front wheel 9, a handle 10, a rear wheel 11, a cowling 12, a battery 13, an engine control unit (ECU) 14 which is an engine controller, and a head lamp device 15.

The vehicle body frame 2 extends in a forward and rearward direction. In the embodiment, the driving unit 3 is an engine and is mounted on the vehicle body frame 2. The fuel tank 4 is disposed above the driving unit 3 and mounted on the vehicle body frame 2. The seat 5 is disposed behind the fuel tank 4 and mounted on the vehicle body frame 2. The steering shaft 6 extends vertically, and is mounted on the front portion of the vehicle body frame 2. The swing arm 7 extends rearward from a region that is in the vicinity of the center of the side surface of the vehicle body. The front end portion of the swing arm 7 is mounted on the vehicle body frame 2 in such a manner that the swing arm 7 is vertically pivotable.

The pair of front forks 8 are coupled to the steering shaft 6. The front wheel 9 is mounted on the lower end portions of the pair of front forks 8. The handle 10 is connected to the upper end portion of the steering shaft 6. The rear wheel 11 is mounted on the rear end portion of the swing arm 7. The cowling 12 is mounted on the vehicle body frame 2 to cover the front portion of the vehicle body. The cowling 12 includes a front cowling member 12a and a side cowling member 12b. The front cowling member 12a covers the upper end portions of the pair of front forks 8. The side cowling member 12b is disposed rearward of the front cowling member 12a and covers the front portion and right and left side portions of the driving unit 3. The battery 13 and the ECU 14 are mounted on the vehicle body frame 2, at a location that is below the seat 5.

The head lamp device 15 is provided on the front portion of the vehicle body and is partially covered by the front cowling member 12a. The head lamp device 15 includes a lamp case 21. The lamp case 21 has a shape in which the surface of the lamp case 21 is continuous with the surface of the front cowling member 12a which is adjacent to the lamp case 21. The entire vehicle body of the vehicle 1 including the lamp case 21 and the front cowling member 12a has a streamline shape in which a dimension in the rightward and leftward direction and a dimension in the vertical direction are gradually increased, from the front end portion of the vehicle body toward the rear portion of the vehicle body (hereinafter this shape will be simply referred to as the streamline shape).

Figure 2:
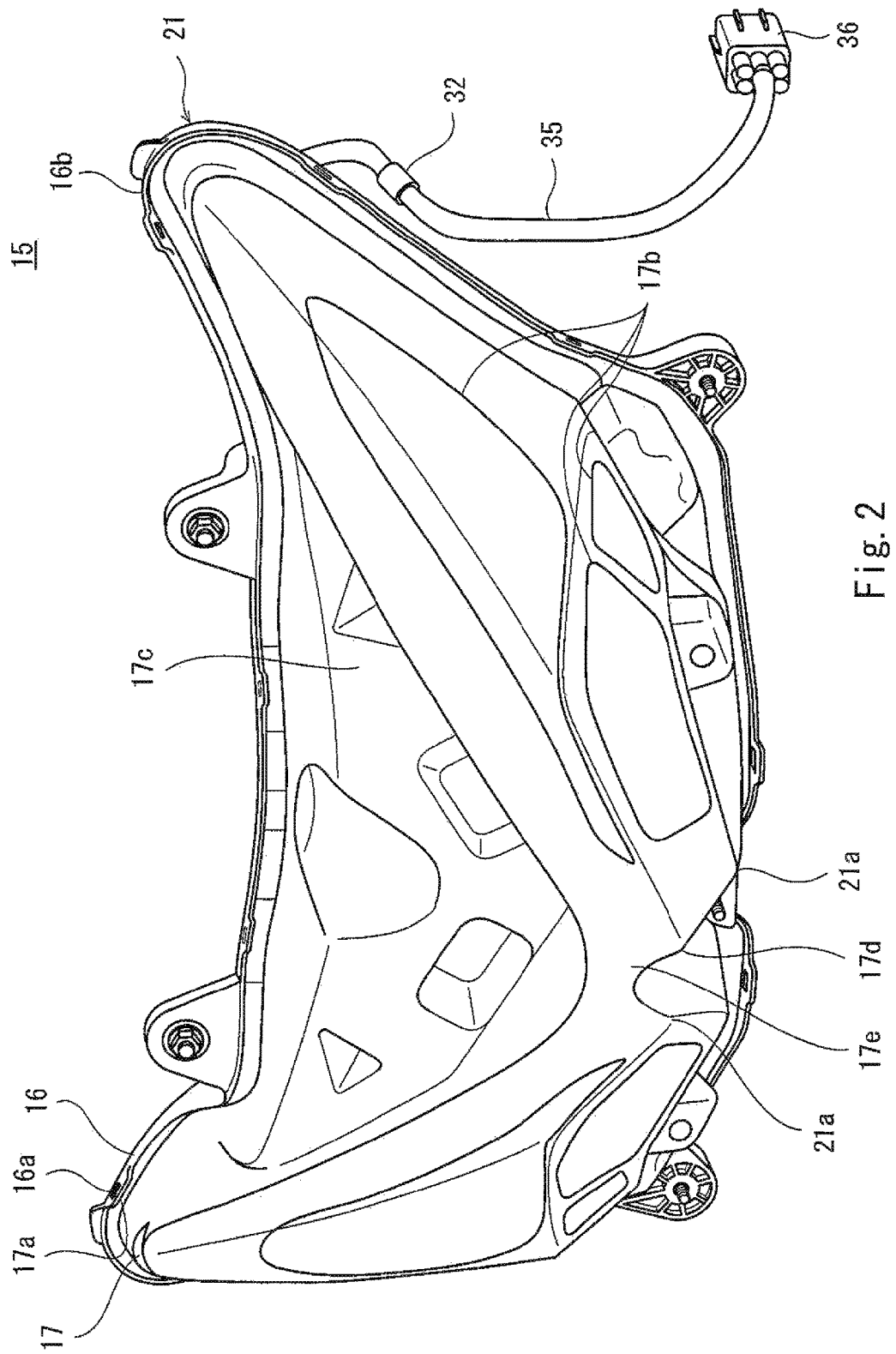
FIG. 2 is a perspective view of a head lamp device of FIG. 1.
Figure 3:
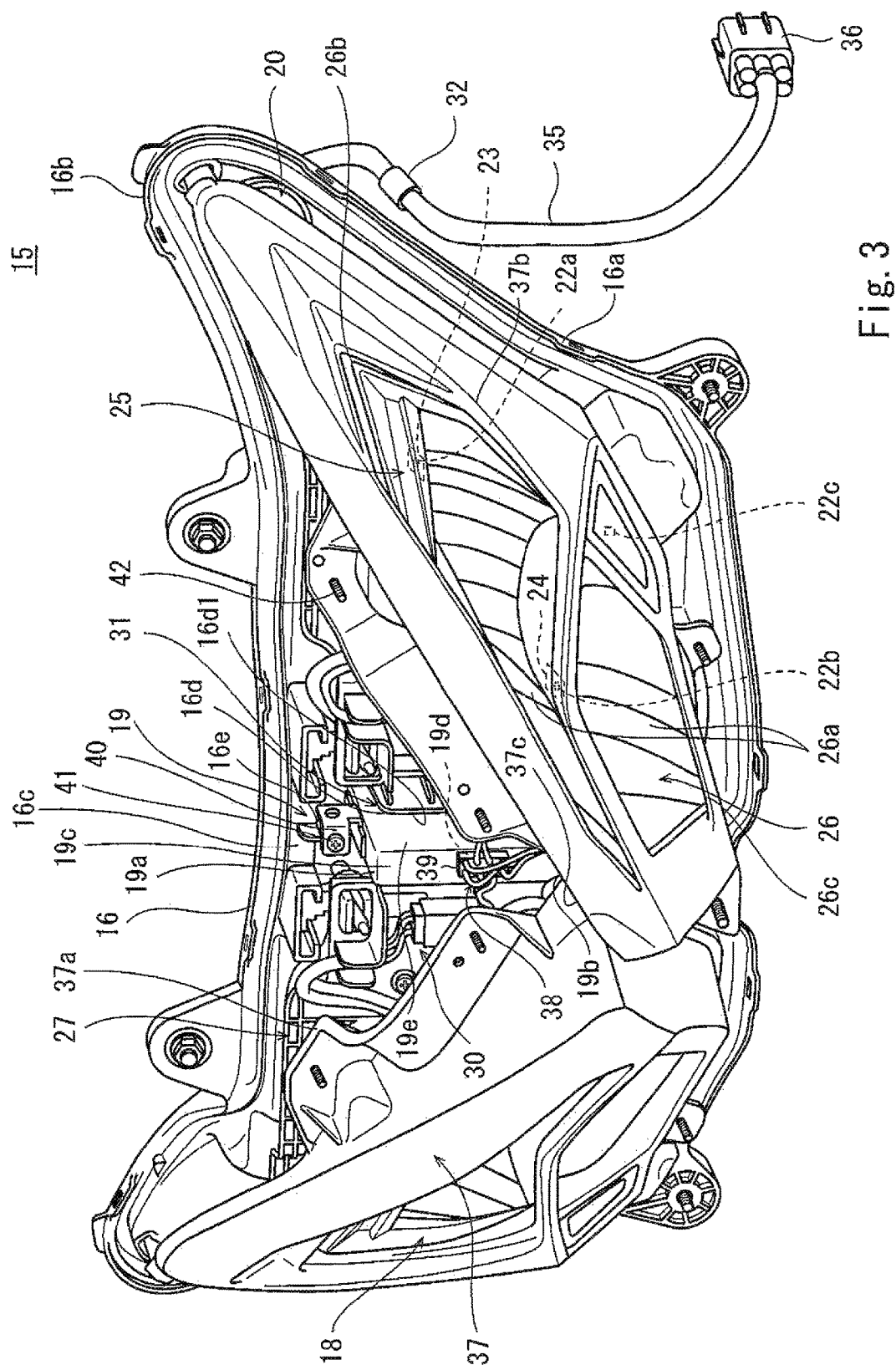
FIG. 3 is a perspective view of the head lamp device of FIG. 1, in which a cover member is not shown.

FIG. 2 is a perspective view of the head lamp device 15 of FIG. 1. FIG. 3 is a perspective view of the head lamp device 15 of FIG. 1, in which a cover member 17 is not shown. As shown in FIGS. 2 and 3, the head lamp device 15 has an external appearance with the streamline shape. The head lamp device 15 includes a pair of lamp units 18, a lighting circuit (power supply circuit) unit 19, optical axis adjustment units 20, and the lamp case 21.

The pair of lamp units 18 are arranged side by side in a direction perpendicular to the forward and rearward direction. In the present embodiment, the direction in which the pair of lamp units 18 are arranged is the rightward and leftward direction (vehicle width direction). The pair of lamp units 18 are arranged with a gap 31 in the rightward and leftward direction. The pair of lamp units 18 have a symmetric shape in the rightward and leftward direction. When viewed from the side (in the front view), the pair of lamp units 18 have a V-shape in which they extend upward from an inward region in the rightward and leftward direction toward an outward region in the rightward and leftward direction. Each of the pair of lamp units 18 includes at least one light emitting element. Specifically, the pair of lamp units 18 are head lamp units including reflectors and four lights. Each of the pair of lamp units 18 includes a light emitting section 25, a reflector 26, a base section 27, a heat sink 28 (see FIG. 5), and a housing 37.

In the present embodiment, the light emitting section 25 includes a plurality of light emitting elements disposed apart from each other. As the plurality of light emitting elements, the light emitting section 25 includes three LED elements 22 (a low beam LED element 22a, a high beam LED element 22b, and a position lamp LED element 22c).

Each of the LED elements 22 emits light in a forward direction. The light emission surfaces of the LED elements 22a, 22b are exposed in reflection surfaces 26a, respectively, of the reflector 26. In the light emitting sections 25 of the pair of lamp units 18, the low beam LED elements 22a are arranged symmetrically in the rightward and leftward direction in the upper portions of the lamp units 18, while the high beam LED elements 22b are arranged symmetrically in the rightward and leftward direction in the lower portions of the lamp units 18, and the position lamp LED elements 22c are arranged symmetrically in the rightward and leftward direction in the lower portions of the lamp units 18.

In the light emitting section 25 of each of the pair of lamp units 18, the high beam LED element 22b is disposed in an inward region in the rightward and leftward direction, and the low beam LED element 22a is disposed outward in the rightward and leftward direction relative to the high beam LED element 22b. The position lamp LED element 22c is disposed outward in the rightward and leftward direction relative to the high beam LED element 22b. The low beam LED element 22a is mounted on a wiring (interconnection) substrate 23, while the high beam LED element 22b is mounted on a wiring (interconnection) substrate 24. The wiring substrates 23, 24 are supported on the heat sink 28, and the LED elements 22a, 22b are thermally coupled to the heat sink 28 (see FIG. 5).

The optical axis adjustment unit 20 adjusts the position of the optical axis of a low beam and the position of the optical axis of a high beam of the lamp unit 18, by changing the position of the lamp unit 18 in the head lamp device 15.

The head lamp device 15 is shifted between a low beam mode in which the low beam LED element 22a is turned on (lighted) and a high beam mode in which the high beam LED element 22b is turned on (lighted). In the present embodiment, the shifting between the low beam mode and the high beam mode is performed by the rider's operation of a switch attached on the handle 10.

The reflector 26 reflects the light emitted from the LED elements 22a, 22b of the light emitting section 25 to emit the light in the forward direction. The reflector 26 has the two reflection surfaces 26a disposed apart from each other. Inside the reflector 26, the LED elements 22a, 22b independently emit the light in a downward direction to the reflection surfaces 26a, respectively. The reflector 26 is supported on the heat sink 28.

The base section 27 is a plate-shaped member, and disposed rearward of the reflector 26. The plate surface of the base section 27 extends in the rightward and leftward direction and the vertical direction, which cross the forward and rearward direction. The peripheral edge of the base section 27 is coupled to the optical axis adjustment unit 20. The heat sink 28 performs heat exchange between heat generated by activation of the LED elements 22a, 22b and air flowing through an outside region of the lamp case 21, such as the air flowing from forward, to release the heat. The heat sink 28 is supported on the base section 27.

The housing 37 accommodates therein the light emitting section 25 and the reflector 26. The housing 37 includes a mounting section 37a. The mounting section 37a has a plate shape. The mounting section 37a protrudes upward from the upper portion of the housing 37 and extends in the rightward and leftward direction. The mounting section 37a is fastened to a cover member 17 (which will be described later) of the lamp case 21 by use of fastener members 42. The housing 37 is provided with an opening 37b at its front end portion to expose therethrough the reflection surfaces 26a of the reflector 26.

The lighting circuit unit 19 causes the light emitting elements to be lighted in such a manner that a current value and a voltage value of electric power supplied from a power supply are controlled. In the present embodiment, the lighting circuit unit 19 adjusts the electric power supplied from the battery 13 so that the light emitting elements can be lighted, and provides the adjusted electric power to the light emitting elements. Specifically, the lighting circuit unit 19 adjusts a voltage and a current of the electric power supplied from the battery 13 so that the LED elements 22a, 22b can be activated, and provides the adjusted electric power to the LED elements 22a, 22b. The lighting circuit unit 19 includes a DC/DC converter which can adjust the voltage of the electric power supplied from the battery 13 so that the LED elements 22a, 22b can be activated.

In the present embodiment, the lighting circuit unit 19 includes a first circuit section which supplies the electric power to the pair of low beam LED elements 22a and a second circuit section which supplies the electric power to the pair of high beam LED elements 22b. In this configuration, in the low beam mode, the first circuit section of the lighting circuit unit 19 causes the pair of low beam LED elements 22a to be turned on (lighted), while in the high beam mode, the second circuit section of the lighting circuit unit 19 causes the pair of high beam LED elements 22b to be turned on (lighted). In this way, the two circuit sections of the lighting circuit unit 19 allow the four LED elements 22a, 22b of the pair of light emitting sections 25 to be turned on (lighted), in a simplified circuit configuration. If a failure occurs in one of the first circuit section and the second circuit section, either the pair of low beam LED elements 22a or the pair of high beam LED elements 22b can be turned on (lighted).

At least a portion of the lighting circuit unit 19 is disposed in the gap 31 formed between the pair of lamp units 18 in the rightward and leftward direction. When viewed from the front (in a front view), the lighting circuit unit 19 is exposed with respect to the pair of lamp units 18, at a center region of the gap 31.

The lighting circuit unit 19 has a shape in which a dimension in the vertical direction is larger than a dimension in the forward and rearward direction, and a dimension in the rightward and leftward direction is smaller than the dimension in the forward and rearward direction. The lighting circuit unit 19 is placed vertically.

The lighting circuit unit 19 is a plate member in which an outer surface perpendicular to its thickness direction has a rectangular shape. Specifically, the rectangular outer surface is disposed in such manner that its long side direction conforms to the vertical direction and its short side direction conforms to the forward and rearward direction. The rectangular outer surface has a shape in which a longitudinal dimension (dimension in the vertical direction) and a lateral dimension (dimension in the forward and rearward direction) are much larger than the thickness of the lighting circuit unit 19. The lighting circuit unit 19 is disposed in such a manner that its thickness direction conforms to the rightward and leftward direction.

An upper end portion 19a of the lighting circuit unit 19 is located below upper end portions 26b of the reflectors 26. A lower end portion 19b of the lighting circuit unit 19 is located below the pair of low beam LED elements 22a located in highest regions of the pair of light emitting sections 25. Also, the lower end portion 19b of the lighting circuit unit 19 is located above lower end portions 26c of the reflectors 26. In the present embodiment, the lower end portion 19b of the lighting circuit unit 19 is located below the pair of high beam LED elements 22b located in lowest regions of the pair of light emitting sections 25. The lighting circuit unit 19 includes a pair of brackets 40 mounted on the upper end portion 19a and the lower end portion 19b, respectively.

The head lamp device 15 includes an inner wire (connector wire) 38 connecting the lighting circuit unit 19 to the LED elements 22a, 22b. The inner wire 38 is provided to connect the LED elements 22a, 22b to the lighting circuit unit 19. The inner wire 38 has a connector 39 at a location connected to the lighting circuit unit 19. The connector 39 is disposed at a front side of the lighting circuit unit 19. The connector 39 of the inner wire 38 is connected to a connection portion 19d provided at a front surface 19c of the lighting circuit unit 19. The inner wire 38 extends forward of the lighting circuit unit 19. The connection portion 19d extends vertically. The optical axis adjustment units 20 are disposed at the peripheral edges of the lamp units 18, respectively, and support the lamp units 18, respectively.

The lamp case 21 has a shape in which a dimension in the rightward and leftward direction is larger than a dimension in the vertical direction. The lamp case 21 also has a shape in which a dimension in the forward and rearward direction, of a center portion in the rightward and leftward direction, is larger than a dimension in the forward and rearward direction, of the remaining portion. The lamp case 21 also has a shape in which a dimension in the vertical direction, of the center portion in the rightward and leftward direction, is larger than a dimension in the vertical direction, of the remaining portion.

The lamp case 21 is an accommodating section which accommodates therein the pair of lamp units 18 and the lighting circuit unit 19. The lamp case 21 has a sealing structure capable of preventing entry of water into the lamp case 21. As shown in FIGS. 2 and 3, the lamp case 21 includes a wall member 16 and the cover member 17.

The wall member 16 has a wall surface perpendicular to the forward and rearward direction, and extends in the rightward and leftward direction at the rear portion of the lamp case 21 (more specifically, a portion of the lamp case 21 which is located rearward of the pair of lamp units 18). The wall member 16 is supported on the front portion of the vehicle body frame 2. At a front side of the wall member 16, the lighting circuit unit 19 and the housings 37 are located.

The wall member 16 includes a pair of restricting wall portions 16d. The pair of restricting wall portions 16d are disposed at a center of the wall member 16 in the rightward and leftward direction. The pair of restricting wall portions 16d protrude forward from the wall surface 16c, extend vertically and are apart from each other in the rightward and leftward direction. The pair of restricting wall portions 16d are support portions which can restrict a displacement of the lighting circuit unit 19 and support the lighting circuit unit 19. In the present embodiment, a value of a dimension in the vertical direction, of the pair of restricting wall portions 16d, is set to a value which is equal to or less than a value of the dimension in the vertical direction, of the lighting circuit unit 19 (a value which is substantially equal to the dimension in the vertical direction, of the lighting circuit unit 19).

The lighting circuit unit 19 is disposed between the pair of restricting wall portions 16d, in a state in which the lighting circuit unit 19 is apart from portions 37c of the pair of housings 37, the portions 37c facing each other in the rightward and leftward direction. Surfaces 16d1 facing each other, of the pair of restricting wall portions 16d, are in contact with right and left side portions 19e of the lighting circuit unit 19, respectively. In this structure, the pair of restricting wall portions 16d support the lighting circuit unit 19 in a state in which the lighting circuit unit 19 is vertically placed.

An upper end portion 16b of the wall member 16 is located above the upper end portion 19a of the lighting circuit unit 19. The wall member 16 includes a pair of bosses 16e extending forward from the wall surface 16c, at a location that is above the upper end portion 19a of the lighting circuit unit 19 and a location that is below the lower end portion 19b of the lighting circuit unit 19, respectively. The pair of brackets 40 of the lighting circuit unit 19 are fastened to the tip end portions of the pair of bosses 16e, respectively, by use of fastener members 41. In the above-described manner, the lighting circuit unit 19 is fastened to the wall member 16 by use of the pair of restricting wall portions 16d and the fastener members 41. The pair of restricting wall portions 16d and the pair of bosses 16e are apart from the pair of housings 37. The optical axis adjustment units 20 are fastened to the wall member 16.

When viewed from the front (in the front view), the peripheral edge of the wall member 16 is located outward of the pair of housings 37. The wall member 16 has a pair of openings 16f (see FIG. 5) which are apart from each other in the rightward and leftward direction. The openings 16f are provided to expose the rear portions of the heat sinks 28 at a rear side of the head lamp device 15. The peripheral edge of each of the openings 16f is sealingly coupled to the peripheral edge of the heat sink 28, by use of a seal member and an elastic member. In this structure, between the opening 16f and the heat sink 28, a sealing structure for preventing entry of water into the lamp case 21 can be provided.

The cover member 17 includes a pair of transmission sections 17b arranged in the rightward and leftward direction, and a non-transmission section 17e. When viewed from the front (in the front view), the transmission sections 17b are provided at portions of the cover member 17 which overlap with the reflection surfaces 26a, respectively, of the reflector 26. The LED elements 22a, 22b emit the light and the reflection surfaces 26a of the reflector 26 reflect the light. Then, the transmission sections 17b transmit this reflected light. In addition, the transmission section 17b also transmits the light emitted from the position lamp LED element 22c. When viewed from the front (in the front view), the non-transmission section 17e is provided in a portion of the cover member 17 which is located between the pair of lamp units 18 in the rightward and leftward direction and covers the lighting circuit unit 19. The cover member 17 includes a center portion 17c at a location between the pair of transmission sections 17b in the rightward and leftward direction. The lighting circuit unit 19 is disposed below and rearward of the center portion 17c of the cover member 17.

The front surfaces of the pair of transmission sections 17b are inclined in an upward direction, from the front toward the rear. The front surface of the center portion 17c is located rearward of the front surfaces of the transmission sections 17b, at a location that is between the pair of transmission sections 17b. The front surface of the center portion 17c is inclined in an upward direction, from the front toward the rear. The cover member 17 is combined with the wall member 16 at a front side of the wall member 16. At the peripheral edge of the wall member 16, a plurality of fitting portions 16a are provided apart from each other. At the peripheral edge of the cover member 17, a plurality of fitting portions 17a are provided apart from each other.

Inside the lamp case 21, an accommodating space 30 is provided. Specifically, inside the lamp case 21, a plurality of separate cases including the wall member 16 and the cover member 17 are joined together to form the accommodating space 30. Between the peripheral edge of the wall member 16 and the peripheral edge of the cover member 17 (the joint surface of the wall member 16 and the joint surface of the cover member 17), a seal member is interposed to sealingly close a clearance formed between the wall member 16 and the cover member 17 in a state in which the fitting portions 16a of the wall member 16 are fitted to the fitting portions 17a of the cover member 17, respectively. In the present embodiment, as the seal member, a resin member having a resilient property is used. In this way, the lamp case 21 can realize the sealing structure capable of preventing entry of water such as rain water from an outside region of the accommodating space 30 into the lamp case 21, by sealingly closing the clearance formed between the wall member 16 and the cover member 17. The lamp units 18 and the lighting circuit unit 19 are accommodated in the accommodating space 30. In this way, in the accommodating space 30 defined by the wall member 16 and the cover member 17 of the lamp case 21, the pair of lamp units 18 and the lighting circuit unit 19 are accommodated together while preventing contact with water from the outside region of the lamp case 21.

The head lamp device 15 includes an external wire (resistor wire) 35. The external wire 35 is connected to the lighting circuit unit 19 and externally extends from the rear portion of the lamp case 21. The external wire 35 includes a connection end portion 36 provided at one end thereof. The connection end portion 36 is used to connect the external wire 35 to the battery 13, the switch, or the like. The ECU 14 sends control signals for causing the LED element 22a, 22b to be turned on/off to the lighting circuit unit 19 through the external wire 35.

A resistor element 32 is connected to a portion of the external wire 35 which is located outside the lamp case 21. If a wiring circuit of the external wire 35 is short-circuited due to a ground leakage, in a portion of the external wire 35 which is located outside the lamp case 21, a short-circuit current flows through the resistor element 32. This makes it possible to prevent an error signal from being transmitted to the lighting circuit unit 19 and hence prevent an incorrect operation of the high beam LED elements 22b.

Figure 4:
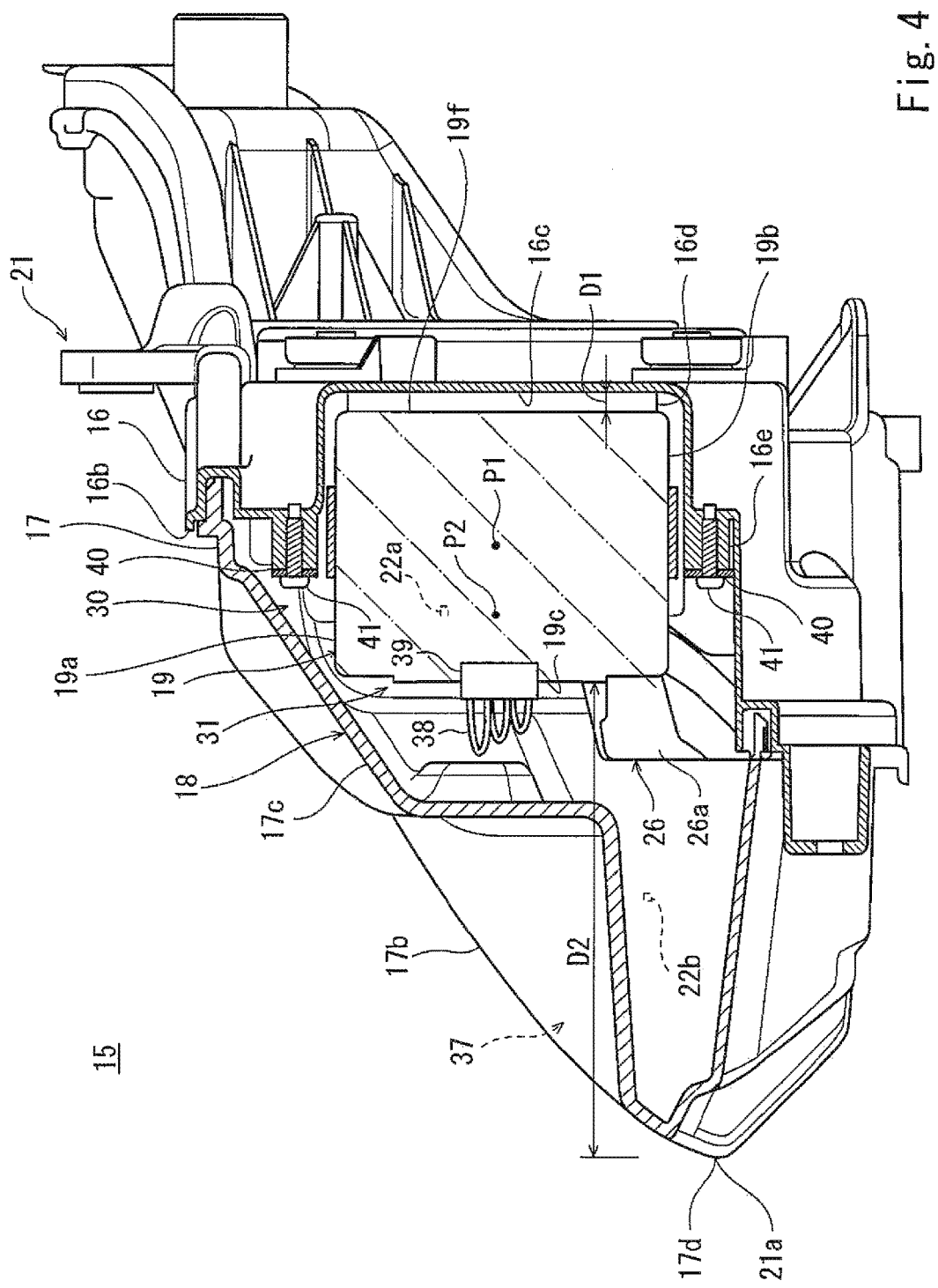
FIG. 4 is a vertical sectional view of the head lamp device of FIG. 1, when viewed in a rightward and leftward direction.
Figure 5:
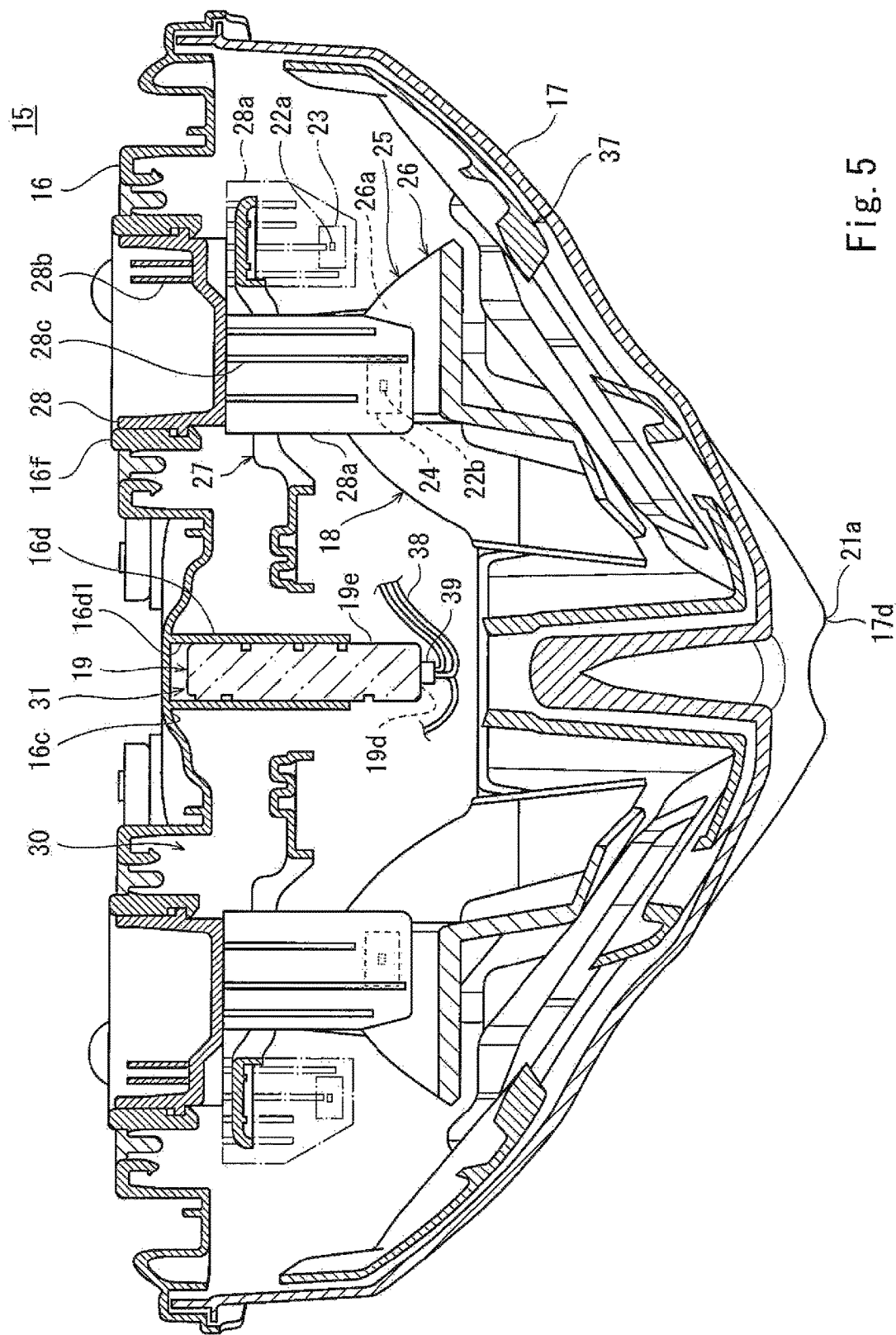
FIG. 5 is a horizontal sectional view of the head lamp device of FIG. 1, when viewed from above (in a plan view).

FIG. 4 is a vertical sectional view of the head lamp device 15 of FIG. 1, when viewed in the rightward and leftward direction. FIG. 4 shows the vertical section of the head lamp device 15 at a location where the lighting circuit unit 19 is disposed. FIG. 5 is a horizontal sectional view of the head lamp device 15 of FIG. 1, when viewed from above (in a plan view).

FIG. 5 shows the horizontal section of the head lamp device 15 in the plan view, at a height position of the upper surface of an arm section 28a of the heat sink 28 to which the wiring substrate 23 is fastened. In FIG. 5, the high beam LED element 22b and the wiring substrate 24 are indicated by broken lines, and the low beam LED element 22a, the wiring substrate 23, and the arm section 28a to which the wiring substrate 23 is fastened are indicated by dot-and-dash lines.

As shown in FIG. 4, the accommodating space 30 extends in the forward and rearward direction and in the vertical direction, in a region that is below the center portion 17c of the cover member 17. The height of the accommodating space 30 increases from the front toward the rear. In this structure, the dimension of the sectional shape of the lamp case 21 which is perpendicular to the forward and rearward direction is increased from a front end portion 21a of the clamp case 21 toward the rear.

The rear portion of the lighting circuit unit 19 is covered by the wall member 16. A rear end surface 19f of the lighting circuit unit 19 is close to and faces the wall member 16, or is in contact with the wall member 16. The lighting circuit unit 19 is disposed in a rear space inside the head lamp device 15. In the present embodiment, the lighting circuit unit 19 is disposed apart from the cover member 17 at a location that is rearward of the front end portion 17d of the cover member 17. In this layout, the accommodating space 30 which opens in the forward and rearward direction is formed between the front end surface 19c of the lighting circuit unit 19 and the front end portion 21a of the lamp case 21 (the front end portion 17d of the cover member 17). Therefore, for example, even if the reflector 26 is formed to have a shape in which its dimension is increased toward an inward region in the rightward and leftward direction, toward the front, the gap 31 between the lighting circuit unit 19 and the lamp unit 18 can be secured.

A center P1 of the lighting circuit unit 19 in the forward and rearward direction is located rearward of a center P2 of the head lamp device 15 in the forward and rearward direction. The lighting circuit unit 19 is disposed in such a manner that a shortest distance D1 in the forward and rearward direction between the rear end surface 19f of the lighting circuit unit 19 and the wall surface 16c of the wall member 16 is smaller than a shortest distance D2 in the forward and rearward direction between the front end surface 19c of the lighting circuit unit 19 and the front end portion 17d of the cover member 17. In the head lamp device 15 with the streamline shape, the value of the shortest distance D1 is desirably set to be much smaller than the value of the shortest distance D2.

As shown in FIGS. 4 and 5, in the head lamp device 15, the high beam LED elements 22b are disposed in front of the low beam LED elements 22a. In the head lamp device 15, the front light emitting elements (the high beam LED elements 22b) of the pair of lamp units 18 are disposed in inward regions, respectively, in the rightward and leftward direction, and the rear light emitting elements (the low beam LED elements 22a) of the pair of lamp units 18 are disposed in outward regions, respectively, in the rightward and leftward direction. In this layout, in the accommodating space 30 of the head lamp device 15, the gap 31 in which the lighting circuit unit 19 is disposed, can be easily formed at the center in the rightward and leftward direction between the pair of lamp units 18, and at a rear side thereof.

The heat sink 28 penetrates the base section 27 in the forward and rearward direction. The heat sink 28 includes a pair of arm sections 28a and a plurality of fins 28b. The arm sections 28a are plate elements having surfaces perpendicular to the vertical direction, and are arranged in the rightward and leftward direction, at the front portion of the heat sink 28. The wiring substrates 23, 24 are fastened to the lower surfaces of the arm sections 28a, respectively, by use of fastener members. Plate-shaped protruding portions 28c protruding upward and extending in the forward and rearward direction are provided on the upper surfaces of the arm sections 28a. The protruding portions 28c serve to reinforce the arm sections 28a. When viewed from the front (in the front view), the arm section 28a to which the wiring substrate 23 is fastened is located obliquely above the arm section 28a to which the wiring substrate 24 is fastened. The fins 28b are plate elements having surfaces perpendicular to the rightward and leftward direction, and are arranged apart from each other at the rear portion of the heat sink 28. The fins 28b release to air the heat generated by activation of the LED elements 22a, 22b.

As described above, in the head lamp device 15, the lighting circuit unit 19 is disposed in the gap 31 formed between the pair of lamp units 18 in the rightward and leftward direction. Compared to a case where the lighting circuit unit 19 is disposed in the outside region of the lamp case 21, the dimension in the forward and rearward direction, of the head lamp device 15, can be reduced, and the size of the head lamp device 15 can be easily reduced. Because of the reduction of the size of the head lamp device 15, the head lamp device 15 can be suitably incorporated in the vehicle 1 with a relatively small dimension in the rightward and leftward direction, even in a case where the pair of lamp units 18 are arranged at the right and left sides, respectively.

The pair of lamp units 18 and the lighting circuit unit 19 are accommodated in the lamp case 21 formed with the sealing structure capable of preventing entry of the water into the lamp case 21. Therefore, compared to a case where the lamp case 21 has the sealing structure and the lighting circuit unit 19 has the sealing structure, the structure of the head lamp device 15 can be simplified, and the size of the head lamp device 15 can be easily reduced. In addition, since it becomes possible to protect the lighting circuit unit 19 from the water by the lamp case 21 without a need to improve a water-proof property of the lighting circuit unit 19, manufacturing cost of the head lamp device 15 can be reduced. Further, since the pair of lamp units 18 and the lighting circuit unit 19 are accommodated together in the lamp case 21, wires connecting the pair of lamp units 18 to the lighting circuit unit 19 can be shortened. Further, since the lighting circuit unit 19 is fastened to the wall member 16, brackets used to mount the lighting circuit unit 19 on the vehicle body frame 2 or the like may be omitted. As a result, the weight of the head lamp device 15 can be reduced.

The lighting circuit unit 19 is formed by a plate-shaped member (body), and its thickness direction conforms to the rightward and leftward direction. Even in a case where a dimension in the rightward and leftward direction of the gap 31 is small, the lighting circuit unit 19 can be easily disposed in the gap 31 with a small dimension. As a result, the dimension in the rightward and leftward direction of the head lamp device 15 can be reduced, while disposing the lighting circuit unit 19 by efficiently utilizing the space.

When viewed from the front (in the front view), the lighting circuit unit 19 is disposed in the center region of the gap 31 formed between the pair of lamp units 18 in the rightward and leftward direction. The lighting circuit unit 19 can be disposed in the center region of the gap 31 formed in the rightward and leftward direction, by efficiently utilizing the space. In addition, the constituents located at the right and left sides of the center region of the gap 31 of the head lamp device 15 can be easily formed to have a symmetric structure in the rightward and leftward direction, and the wires of the pair of lamp units 18 located at the right and left sides of the center region of the gap 31 of the head lamp device 15 can be laid out in the same manner. As a result, the structure of the head lamp device 15 can be simplified, and the size of the head lamp device 15 can be easily reduced.

Since the pair of lamp units 18 are arranged in the rightward and leftward direction, the gap 31 can be easily formed between the pair of lamp units 18 in the rightward and leftward direction, and the lighting circuit unit 19 can be easily disposed in the gap 31.

When viewed from the front (in the front view), the non-transmission section 17e of the cover member 17 is provided in a portion of the cover member 17 which is located between the pair of lamp units 18 in the rightward and leftward direction, and covers the lighting circuit unit 19, the lighting circuit unit 19 is not seen from an outside region of the vehicle 1. As a result, the external appearance of the vehicle 1 can be improved.

The lighting circuit unit 19 is disposed in the gap 31 in such a manner that the center P1 of the lighting circuit unit 19 in the forward and rearward direction is located rearward of the center P2 of the head lamp device 15 in the forward and rearward direction. Therefore, even in the case of the head lamp device 15 having the streamline shape, the lighting circuit unit 19 can be disposed in the gap 31 by efficiently utilizing the space, and the size of the head lamp device 15 can be easily reduced.

Since the connector 39 of the inner wire 38 is disposed at the front side of the lighting circuit unit 19, the lighting circuit unit 19 can be easily disposed at the rear side. Therefore, even in the case of the head lamp device 15 having the streamline shape, the lighting circuit unit 19 can be disposed by efficiently utilizing the space, and the size of the head lamp device 15 can be easily reduced.

Since the connector 39 of the inner wire 38 is disposed at the front end surface 19c of the lighting circuit unit 19, the lighting circuit unit 19 can be made closer to the wall member 16, and the dimension in the forward and rearward direction of the pair of restricting wall portions 16d is not increased, compared to a case where the connector 39 is disposed at the rear end surface 19f of the lighting circuit unit 19. This makes it possible to easily reduce the dimension in the forward and rearward direction of the head lamp device 15.

Since the connection portion 19d of the lighting circuit unit 19 extends vertically, the length of the inner wire 38 connected to the connection portion 19d can be reduced. Thus, the lighting circuit unit 19 can be connected to the LED element 22a located above the connection portion 19d and the LED element 22b located below the connection portion 19d, via the inner wire 38 with a short distance.

The lighting circuit unit 19 has a shape in which the dimension in the forward and rearward direction is smaller than the dimension in the vertical direction. Therefore, the lighting circuit unit 19 can be disposed in the gap 31 with a dimension which is small in the forward and rearward direction, by efficiently utilizing the space, and the dimension in the forward and rearward direction of the head lamp device 15 can be easily reduced.

The lighting circuit unit 19 is disposed between the pair of housings 37 and located below the upper end portion 16b of the wall member 16. In this structure, the lighting circuit unit 19 can be disposed in the gap 31 by efficiently utilizing the space, and the lighting circuit unit 19 does not protrude upward from the upper end portion 16b of the wall member 16. As a result, the dimension in the vertical direction of the head lamp device 15 can be easily reduced.

The upper end portion 19a of the lighting circuit unit 19 is located below the upper end portions 26b of the reflectors 26, and the lower end portion 19b of the lighting circuit unit 19 is located above the lower end portions 26c of the reflectors 26. In this structure, the upper end portion 19a of the lighting circuit unit 19 does not protrude in an upward direction to be higher than the upper end portions 26b of the reflectors 26, and the lower end portion 19b of the lighting circuit unit 19 does not protrude in a downward direction to be lower than the lower end portions 26c of the reflectors 26. This makes it possible to easily reduce the dimension in the vertical direction of the head lamp device 15 provided with the reflectors 26.

When viewed from the front (in the front view), the lighting circuit unit 19 is disposed below the upper end portion 16b of the wall member 16, and does not protrude in the upward direction to be higher than the upper end portion 16b of the wall member 16. This makes it possible to easily reduce the dimension in the vertical direction of the head lamp device 15.

When viewed from the front, the lighting circuit unit 19 has a shape in which the dimension in the rightward and leftward direction is smaller than the dimension in the forward and rearward direction and extends vertically. In this structure, the lighting circuit unit 19 can be disposed in the gap 31 by efficiently utilizing the space, and the dimension in the rightward and leftward direction and the dimension of in the forward and rearward direction, of the head lamp device 15, can be easily reduced.

Since the resistor element 32 is connected to a portion of the external wire 35 located outside the lamp case 21, it is not necessary to dispose the resistor element 32 inside the accommodating space 30 of the lamp case 21. In this configuration, the lighting circuit unit 19 can be disposed in the gap 31 by efficiently utilizing the space, and the size of the head lamp device 15 can be more easily reduced. The resistor element 32 exposed outside the lamp case 21 can be easily changed (replaced), and the dimension of the resistor element 32 is not constrained by the lamp case 21. Since the resistor element 32 contacts the air such as the air flowing from the front, outside the lamp case 21, heat can be released well from the resistor element 32.

The lighting circuit unit 19 is disposed apart from the cover member 17 at a location that is rearward of the front end portion 17d of the cover member 17. Therefore, it is not necessary to increase the dimension of the cover member 17 to avoid interference between the center portion 17c of the cover member 17 and the lighting circuit unit 19. As a result, the dimension of the cover member 17 is not constrained by the lighting circuit unit 19 disposed in the gap 31.

The lighting circuit unit 19 may have a shape in which the dimension in the vertical direction is smaller than the dimension in the forward and rearward direction. In this configuration, the lighting circuit unit 19 can be disposed in the gap 31 with a dimension which is small in the vertical direction, by efficiently utilizing the space, and the dimension in the vertical direction of the head lamp device 15 can be easily reduced.

The present invention is not limited to the above-described embodiment. The above-described configuration may be changed, added to or deleted from, within a scope of the spirit of the preset invention. The vehicle is not limited to the motorcycle and may be other vehicles such as a three-wheeled vehicle, personal watercraft (PWC), a snow mobile, and an all terrain vehicle (ATV).

The driving unit 3 may be an electric motor which generates driving power for allowing the vehicle 1 to travel, or an engine and the electric motor.

The light emitting element may be, for example, an organic electroluminescent device (OLED), instead of the LED element. The light emitting element may be an existing light emitting element so long as the electric power supplied from the power supply is adjusted by the lighting circuit unit 19 and thereby the light emitting element is turned on/off. Further, the pair of lamp units 18 may include a plurality of light emitting elements of different kinds.

The lamp unit 18 may be a head lamp unit which directly emits light. In this case, the reflector 26 may be omitted. Further, the pair of lamp units 18 may be arranged, for example, in the vertical direction, instead of the rightward and leftward direction.

The rear portion of the lighting circuit unit 19 may be partially located at the rear side of the wall member 16. In this case, for example, the rear portion of the lighting circuit unit 19 may be partially located in a region that is rearward of the wall member 16, through a hollow portion or an opening formed in a portion of the wall member 16. Further, a portion of the lighting circuit unit 19 which is located at the rear side of the wall member 16 may have a sealing structure for preventing entry of the water into the lighting circuit unit 19. Further, a seal member may be provided between the hollow space or the opening of the wall member 16 and the lighting circuit unit 19, to form a sealing structure for preventing entry of the water into the lamp case 21.

The pair of lamp units 18 may not include the four lights. For example, in a case where the pair of lamp units 18 include two lights, the lighting circuit unit 19 is disposed in a gap (the gap 31 in the above-described embodiment) formed in the direction in which the pair of lamp units 18 are arranged. Thus, the advantages similar to those of the above-described embodiment can be obtained.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

The invention claimed is:

1. A head lamp device of a vehicle, the head lamp device comprising:
   a pair of lamp units arranged in a direction perpendicular to a forward and rearward direction of a vehicle body, each of the pair of lamp units including at least one light emitting element, one of a pair of reflectors which reflect light emitted from the at least one light emitting element, and a heat sink thermally coupled to the at least one light emitting element;
   a lighting circuit unit which is supplied with electric power from a power supply and lights the at least one light emitting element; and
   a lamp case accommodating the light emitting element and the pair of reflectors,
   wherein the at least one light emitting element is an LED element,
   wherein at least a portion of the lighting circuit unit is disposed in a gap formed between the pair of lamp units in the direction in which the pair of lamp units are arranged,
   wherein the lighting circuit unit is disposed between two heat sinks in the direction in which the pair of lamp units are arranged,
   wherein the light emitting elements of the pair of lamp units are supplied with electric power by the lighting circuit unit, and wherein the lighting circuit unit is fastened to a center of a wall member of the lamp case, the wall member being disposed at a rear portion of the lamp case and extending in the direction in which the pair of lamp units are arranged, the center of the wall member being a center in the direction in which the pair of lamp units are arranged.

2. The head lamp device according to claim 1,
wherein the lamp case is formed with a sealing structure for preventing entry of water into the lamp case,
wherein the lighting circuit unit is accommodated inside the lamp case.

3. The head lamp device according to claim 1,
wherein the lighting circuit unit is a plate-shaped member and is disposed in such a manner that a thickness direction of the lighting circuit unit conforms to the direction in which the pair of lamp units are arranged.

4. The head lamp device according to claim 1,
wherein when viewed from a front, the lighting circuit unit is disposed in a center region of the gap.

5. The head lamp device according to claim 1,
wherein the direction in which the pair of lamp units are arranged is a rightward and leftward direction of the vehicle body, and
wherein the lighting circuit unit is disposed in the gap formed between the pair of lamp units in the rightward and leftward direction.

6. The head lamp device according to claim 1,
wherein a center of the lighting circuit unit in the forward and rearward direction is located rearward of a center of the head lamp device in the forward and rearward direction.

7. The head lamp device according to claim 1, further comprising:
a connector wire connecting the lighting circuit unit to the light emitting element,
wherein the connector wire includes a connector at a portion connected to the lighting circuit unit, and
wherein the connector is disposed at a front side of the lighting circuit unit.

8. The head lamp device according to claim 1, further comprising:
an accommodating section which accommodates therein the lighting circuit unit; and
a resistor wire connected to the lighting circuit unit and extending to an outside region of the accommodating section,
wherein a resistor element is connected to a portion of the resistor wire which is located outside the accommodating section.

9. The head lamp device according to claim 1, further comprising:
an optical axis adjustment unit which adjusts an optical axis of the light emitting element with respect to the lamp case,
wherein the optical axis adjustment unit is fastened to the lamp case.

10. The head lamp device according to claim 1,
wherein the wall member extends in a rightward and leftward direction, and
wherein the lighting circuit unit is disposed so that a shortest distance in a forward and rearward direction between a rear end surface of the lighting circuit unit and a wall surface of the wall member is smaller than a shortest distance in the forward and rearward direction between a front end surface of the lighting circuit unit and a front end portion of the lamp case.

11. A head lamp device of a vehicle, the head lamp device comprising:
a pair of lamp units arranged in a direction perpendicular to a forward and rearward direction of a vehicle body, each of the pair of lamp units including at least one light emitting element;
a lighting circuit unit which is supplied with electric power from a power supply and lights the at least one light emitting element; and
a lamp case accommodating the pair of lamp units and the lighting circuit unit, and having a sealing structure capable of preventing entry of water into the lamp case,
wherein at least a portion of the lighting circuit unit is disposed in a gap formed between the pair of lamp units in the direction in which the pair of lamp units are arranged,
wherein the lighting circuit unit is fastened to a wall member of the lamp case, the wall member being disposed at a rear portion of the lamp case and extending in a rightward and leftward direction, and
wherein the lighting circuit unit extends forward from the wall member.

12. A head lamp device of a vehicle, the head lamp device comprising:
a pair of lamp units arranged in a direction perpendicular to a forward and rearward direction of a vehicle body, each of the pair of lamp units including at least one light emitting element;
a lighting circuit unit which is supplied with electric power from a power supply and lights the at least one light emitting element;
a lamp case accommodating the pair of lamp units and the lighting circuit unit, and having a sealing structure capable of preventing entry of water into the lamp case; and
an optical axis adjustment unit which adjusts an optical axis of the light emitting element with respect to the lamp case,
wherein at least a portion of the lighting circuit unit is disposed in a gap formed between the pair of lamp units in the direction in which the pair of lamp units are arranged,
wherein the lighting circuit unit is fastened to a wall member of the lamp case, the wall member being disposed at a rear portion of the lamp case and extending in the direction in which the pair of lamp units are arranged, and
wherein the lighting circuit unit extends forward from the wall member.

* * * * *